(12) United States Patent
Suzuki (10) Patent No.: US 6,292,602 B1
(45) Date of Patent: Sep. 18, 2001

(54) OPTICAL SIGNAL TRANSMISSION SYSTEM AND OPTICAL SIGNAL TRANSMISSION DEVICE USING THE SAME

(75) Inventor: Yasuo Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/172,238

(22) Filed: Oct. 14, 1998

(30) Foreign Application Priority Data

Feb. 26, 1998 (JP) .................................................. 10-045614

(51) Int. Cl.⁷ ...................................................... G02B 6/28
(52) U.S. Cl. .............................................................. 385/24
(58) Field of Search ......................... 385/24, 15; 359/109

(56) References Cited

U.S. PATENT DOCUMENTS

| | | | |
|---|---|---|---|
| 5,430,568 | * 7/1995 | Little et al. | 359/124 |
| 5,532,868 | * 7/1996 | Gnauck et al. | 359/332 |
| 6,026,204 | * 2/2000 | Chbat | 385/24 |

FOREIGN PATENT DOCUMENTS

| | | |
|---|---|---|
| 7-98464 | 4/1995 | (JP) . |
| 7-301830 | 11/1995 | (JP) . |
| 8-171102 | 7/1996 | (JP) . |
| 9-203914 | 8/1997 | (JP) . |

* cited by examiner

*Primary Examiner*—Frank G. Font
*Assistant Examiner*—Phil Natividad
(74) *Attorney, Agent, or Firm*—Staas & Halsey LLP (57) ABSTRACT

An optional transmission system is provided to realize generating a sub-signal without employing an exclusive optical source, determining normality of repeaters, and switching for sub-signal transmission when a failure occurs. The an optical signal transmission system includes first and second optical signal transmission devices connected each other through an optical transmission path. The first optical signal transmission device generates phase conjugation lights having first and second optical wavelengths, which are different each other, according to a main signal light having a first optical wavelength and an exciting light of a second optical wavelength, modulates intensity of the phase conjugation light of the second optical wavelength by a sub-signal, of which speed is lower than that of the main signal light, and concurrently transmits the first phase conjugation light and the second phase conjugation light, of which intensity is modulated by the sub-signal, through the optical transmission path. The second optical signal transmission device demultiplexes in wavelength division the first phase conjugation light transmitted through the optical transmission path and the second phase conjugation light intensively modulated by the sub-signal, respectively to receive the main and sub-signal.

19 Claims, 7 Drawing Sheets

OPTICAL SIGNAL TRANSMISSION SYSTEM AND OPTICAL SIGNAL TRANSMISSION DEVICE USING THE SAME

BACKGROUND OF THE INVENTION

1. Field of the Invention

The present invention relates to an optical signal transmission system and an optical signal transmission device using the system. More particularly, it relates to an optical signal transmission system using single mode optical fibers (SMF) as transmission paths to realize advantageous optical signal transmissions at super high speed, and an optical signal transmission device using the system.

2. Description of the Related Art

No optical transmission system has achieved 10 Gb/s optical signal transmission or greater at super high speed using single mode optical fibers as transmission paths until now.

Especially, although experimental results of generating a sub-signal, determining normality of repeaters, and switching optical transmission paths needed for an optical transmission system have been reported, no system for practical use has been reported.

When the conventional system is employed for generating a sub-signal, determining normality of repeaters, and switching optical transmission paths, the following structure may be formed, for example:

In other words, it is assumed that a sub-signal is accumulated by electrically modulating a main signal. Alternatively, the different optical source from the main signal is used to realize a method for generating a sub-signal determining normality of repeaters, and switching optical transmission paths.

For electrical modulation of a main signal, however, there is a need for devising a frame structure of the main signal. Especially, when a 10 Gb/s main signal or greater is employed, modulation causes much technical troubles relative to super high speed operations in an electrical circuit. Alternatively, this causes problems, such that a circuit scale becomes larger, and further, the cost becomes larger when different optical sources are employed respectively for main and sub-signals.

SUMMARY OF THE INVENTION

Accordingly, it is an object of the present invention to provide an optical signal transmission system to generate a sub-signal without employing an exclusive optical source, determining normality of repeaters, and switching for sub-signal transmission when a failure occurs, and an optical transmitter using the system.

The above-described problems are attained by 1. an optical signal transmission system, including first and second optical signal transmission devices connected each other through an optical transmission path, the first optical signal transmission device generating phase conjugation lights having first and second optical wavelengths, which are different each other, according to a main signal light having a first optical wavelength and an exciting light of a second optical wavelength, modulating intensity of the phase conjugation light of the second optical wavelength by a sub-signal, of which speed is lower than that of the main signal light, and concurrently transmitting the first phase conjugation light and the second phase conjugation light, of which intensity is modulated by the sub-signal, through the optical transmission path.

Additionally, the second optical signal transmission device demultiplexing in wavelength division the first phase conjugation light transmitted through the optical transmission path and the second phase conjugation light intensively modulated by the sub-signal, respectively to receive the main and sub-signals.

Alternatively, in other preferred mode, the first optical signal transmission device generates phase conjugation lights having first and second optical wavelengths, which are different each other, according to a main signal light of a first optical wavelength and an exciting light of a second optical wavelength, modulates intensity of the main signal light of the first optical wavelength by a sub-signal of which speed is lower than that of the main signal light, and concurrently transmits the first phase conjugation light and the main signal light, of which intensity is modulated by the sub-signal, through the optical transmission path.

Furthermore, in the other mode, the first optical signal transmission device generates plural phase conjugation lights, employs one of the plural phase conjugation lights to transmit a main signal light, modulates intensities of the phase conjugation lights, which are different from the one phase conjugation light for transmitting the main signal, with a sub-signal, of which speed is lower than that of the main signal light, and concurrently transmits the optical signal, of which intensity is modulated, with the phase conjugation light for transmitting the main signal light.

It becomes possible that wavelength of the phase conjugation light and excision light except that of the above-described phase conjugation light for transmitting the main signal are employed for identifying plural repeating amplifiers arranged on the optical transmission path to enable determination of a failed point.

Alternatively, the above-described sub-signal can be employed as switch information of working and protection groups.

Further, other objects of the present invention will become clear by the description for explaining embodiment according to the attached drawings.

DESCRIPTION OF THE PREFERRED EMBODIMENTS

Throughout the following descriptions, the same reference numerals are used to denote and identify corresponding or identical components.

Figure 1:
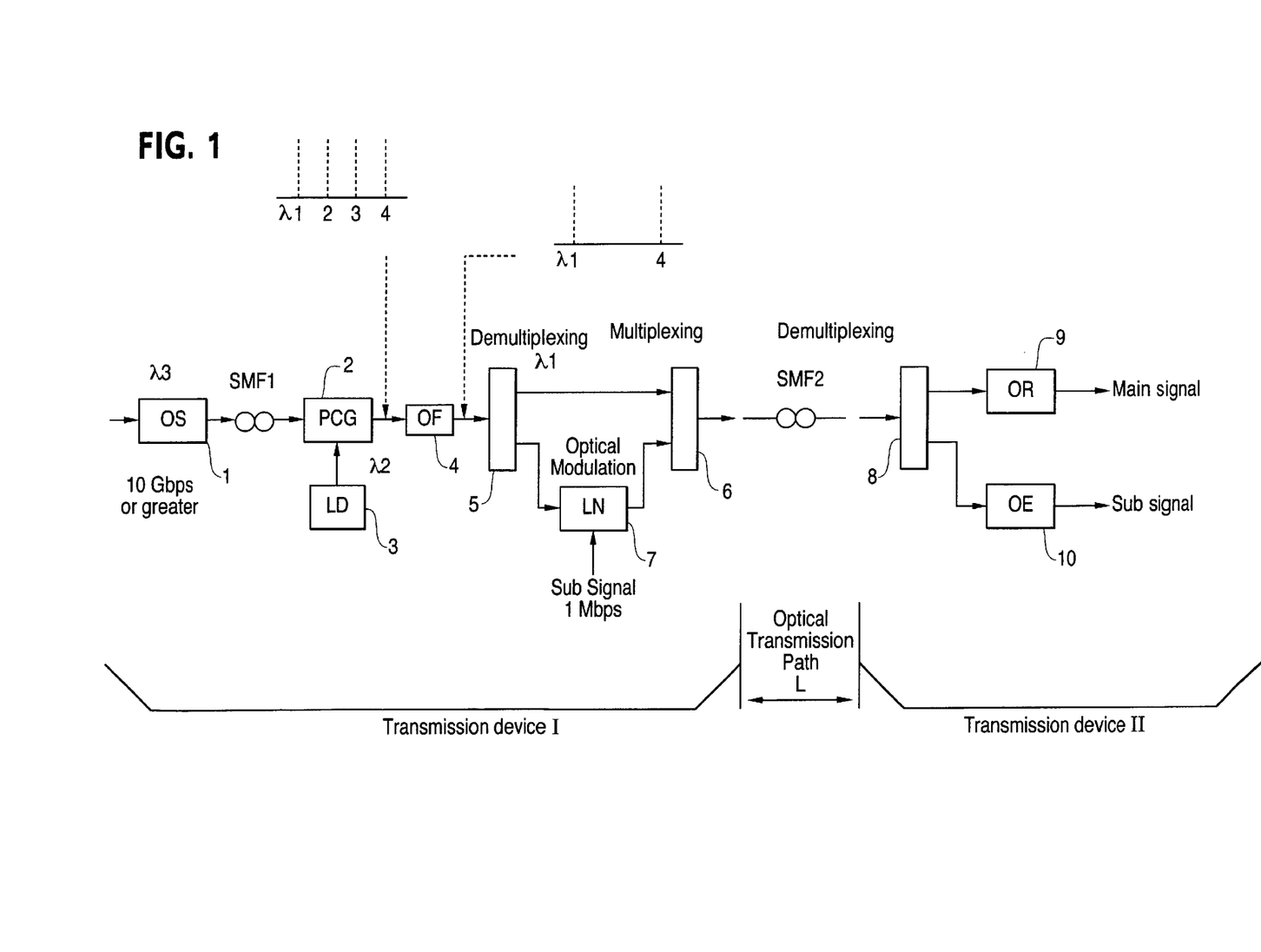
FIG. 1 is a block diagram of an embodiment according to the present invention.

FIG. 1 is a block diagram of an embodiment according to the present invention. In FIG. 1, transmission devices I and II for transmitting and receiving optical signals are linked to each other through an optical transmission path L of a single mode optical fiber SMF2.

An optical signal for 10 Gbp/s transmission or greater, of which wavelength is $\lambda 3$, is input as a main signal from an optical transmitter 1 in the transmission device I. The main signal of wavelength $\lambda 3$ is input to an 1.31 μm zero-dispersion single mode optical fiber SMF1. The 1.31 μm zero-dispersion signal mode optical fiber SMF1 has a characteristic equivalent to that of the single mode optical fiber SMF 2 on the transmission path L.

In this example, when the main signal is transmitted through the zero-dispersion single mode optical fiber SMF1, the main signal input to the optical fiber SMF1 may have a waveform distortion according to the characteristic of the optical fiber SMF1.

The main signal with the waveform distortion is further input to a phase conjugation light generator 2. In here, an optical amplifier, not shown in FIG. 1, adaptively controls a level of optical diagram if necessary, for example. An optical signal of wavelength $\lambda 2$ generated from a laser diode 3 is concurrently input to the phase conjugation light generator 2.

A principle of the phase conjugation light generator 2 is described in Japanese laid-open patent publications No. 7-98464 and 9-203914. A phase conjugation light generator 2 uses optical non-linear elements, such as a dispersion shift fiber or a semi-conductor optical amplifier, to generate phase conjugation lights of wavelengths $\lambda 1$ and $\lambda 4$ respectively for optical signals of wavelengths $\lambda 3$ and $\lambda 2$.

Therefore, in FIG. 1, optical lights having spectrum intensities of wavelengths $\lambda 1$ to $\lambda 4$ are output from the phase conjugation generator 2. The spectrum lights of wavelengths $\lambda 1$ to $\lambda 4$ are input to an optical filter 4.

After that, the phase conjugation lights of wavelengths $\lambda 1$ and $\lambda 4$ are selected and output from the optical filter 4. An optical demultiplexer 5 demultiplexes the outputs from the optical filter 4 into optical signals of wavelengths $\lambda 1$ and $\lambda 4$. An optical signal of wavelength $\lambda 1$ is a phase conjugation light for transmitting the main signal, and therefore, the optional signal is transmitted to an optical multiplexer 6 as it is.

On the other hand, as the generated optical signal of wave length $\lambda 3$ is not used, the optical filter 4 obstructs it in general. However, in the present invention, the optical signal of wavelength $\lambda 3$ is not obstructed in the optical filter 4, and a sub-signal is accumulated to the optional signal. In other words, an external optical modulator 7 modulates the optical signal of wavelength $\lambda 4$, which is demultiplexed in the demultiplexer 5 with the sub-signal.

In this embodiment, since the external operation modulator 7 can execute operations in low speed, variety of modulators such as a (lithium niobate) mach-zehander modulator or semiconductor modulator can be employed. An input optical signal to the external optical modulator 7 is employed as the sub-signal for electrical modulation. Thereby, the optical signal of wavelength $\lambda 4$ is intensity-modulated by the sub-signal.

The sub-signal may be of 1 Mbps speed, for example. It becomes apparent from comparison with the 10 Gbp/s main signal or greater that the sub-signal has a relatively low-speed.

The output from the external optical modulator 7 is input and multiplexed in the optical multiplexer 6 with the optical signal of wavelength $\lambda 1$, which is a phase conjugation signal of the main signal, to transmit through the optical transmission path L. The output from the optical multiplexer 6 is transmitted through the optical transmission path L of the single mode optical fiber SMF 2 and is transmitted to the transmission device II.

In this example, the spectrum information of a main signal light of wavelength $\lambda 3$ is transmitted over an optical signal of wavelength $\lambda 1$ with a phase conjugation relationship. When the phase conjugation light of wavelength $\lambda 1$ is transmitted to the optical transmission path L, the single mode optical fibers SMF1 and SMF2 have an equivalent characteristic. Therefore, the phase conjugation light of wavelength $\lambda 1$ generates distortion equivalent to that generated in the single mode optical fiber SMF1.

However, there is a phase conjugation relationship between the spectrums of wavelengths 1 and 3. Therefore, the distortion generated in the single mode optical fiber SMF1 can be cancelled.

That is, the waveform distortion of the signal light can be compensated. A demultiplexer 8 demultiplexes the main and sub-signals of which waveform distortions are compensated. The optical receiver 9 receives the main signal, and an O/E converter 10 converts the sub-signal into an electrical signal and outputs the converted signal.

In here, the optical signal light of wavelength $\lambda 4$ includes spectrum information of a phase conjugation relationship with the exciting light of wavelength $\lambda 2$. Although the optical light of wavelength $\lambda 4$ is considered as a direct current light, no problems occur if the main signal were used instead because the speed of the sub-signal (1Mbp/s) is much lower than that of the main signal (10 Gbp/s or greater). That is, there would be no problem even if the light of wavelength $\lambda 4$ had information carried by modulating the main signal light.

Further, the optical multiplexer 6 multiplexes the optical signal of wavelength $\lambda 4$, of which intensity is modulated by the sub-signal in the external optical modulator 7, as above-described, with the main signal to transmit the multiplexed signal through the optical transmission path L. The sub-signal of which wavelength distortion is not compensated during transmission like the main signal receives the waveform distortion, but no problem occurs because the speed of the sub-signal is low.

Figure 2:
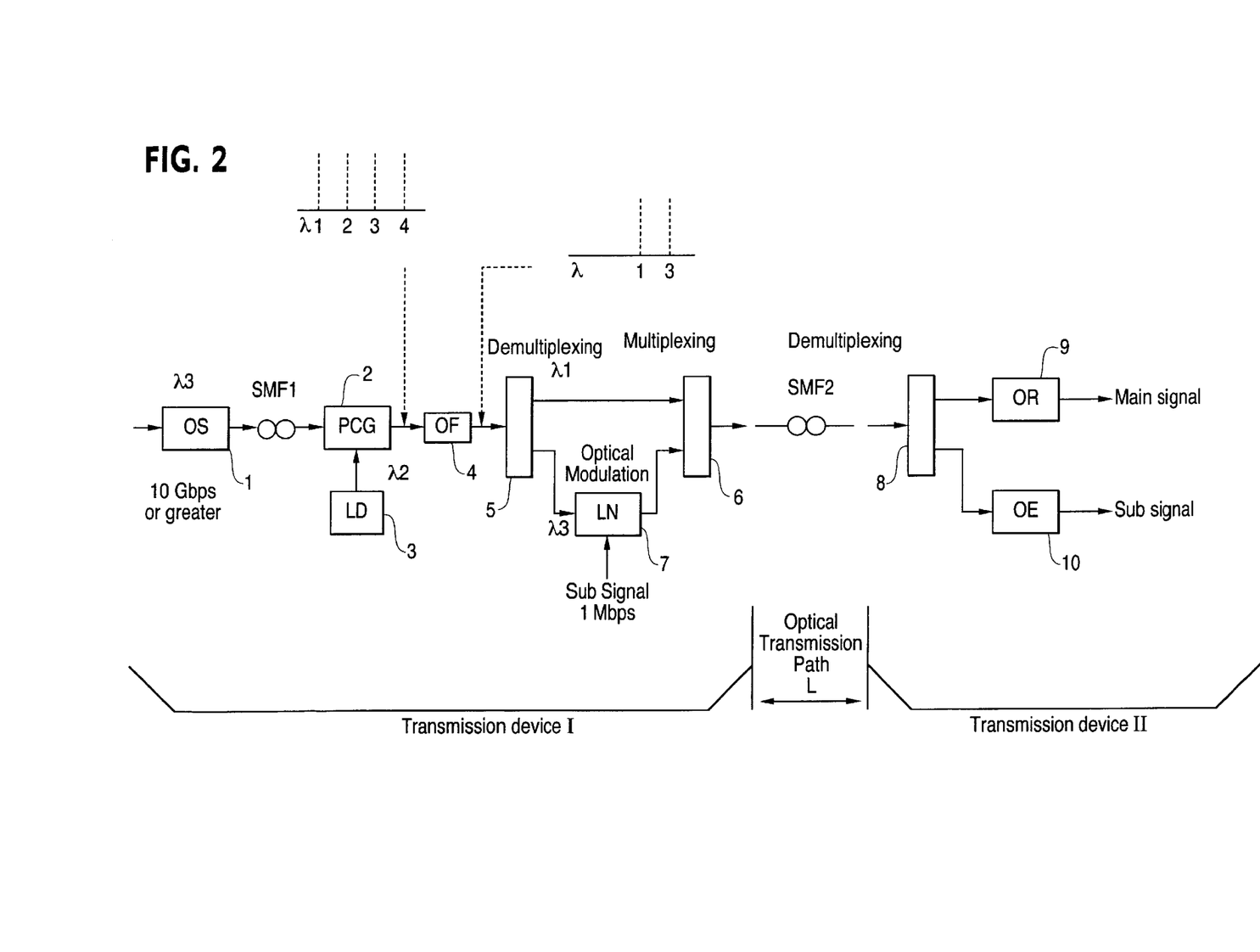
FIG. 2 is a block diagram of other embodiment according to the present invention.

FIG. 2 is a block diagram showing the other embodiment according to the present invention. It is a different feature from the embodiment shown in FIG. 1 to extract a phase conjugation light of wavelength $\lambda 1$ and a signal light of wavelength $\lambda 3$ in an optical demultiplexer 5.

Therefore, an optical filter 4 is formed so as to select optical signals of wavelengths $\lambda 1$ and $\lambda 3$. As the signal light of wavelength $\lambda 1$ is a phase conjugation light of the main signal of wavelength $\lambda 3$, the signal light is transmitted from a multiplexer 6 to an optical transmission path L as it is.

Since the main signal light of wavelength $\lambda 3$ becomes useless after generating the phase conjugation light, the optical filter 4 obstructs the main signal light of wavelength $\lambda 3$ in FIG. 1. However, in the embodiment of FIG. 2, an external optical modulator 7 accumulates the sub-signal to the signal light of wavelength $\lambda 3$. Other structures are similarly to those of the embodiment of FIG. 1.

Figure 3:
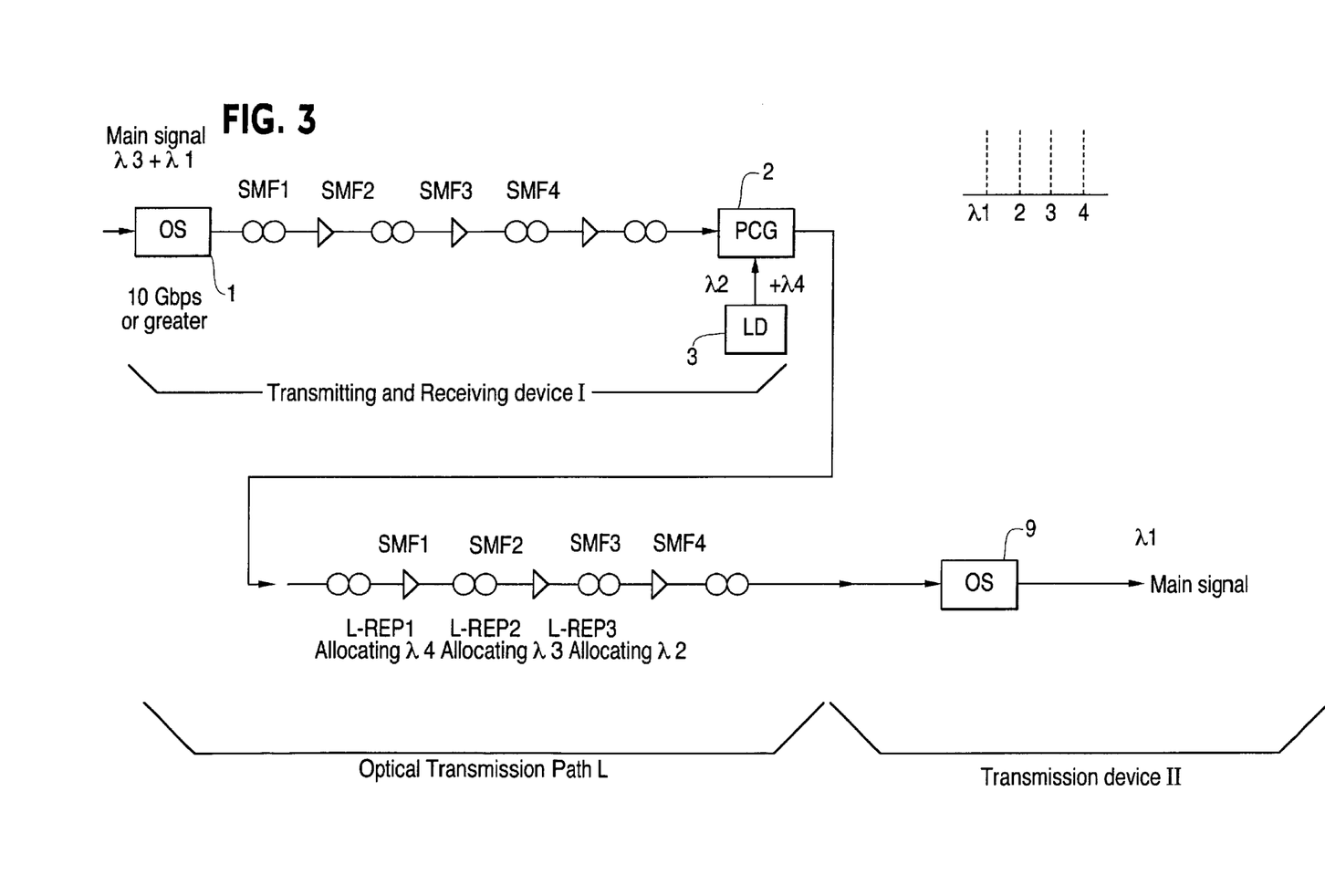
FIG. 3 is a block diagram of an embodiment when monitoring plural linear optical repeaters according to the present invention.

FIG. 3 is a block diagram of an embodiment employing the present invention when monitoring plural linear optical repeaters. Prescribed identifying wavelengths $\lambda 4$, $\lambda 3$ and $\lambda 2$ are respectively allocated to the plural linear optical repeaters L-REP1, L-REP2 and L-REP3, which are located on an optical transmission path L for linking between the transmission devices I and II.

In other words, the main signal light of wavelength λ3 and a phase conjugation light of wavelength λ1 for the main signal light of wavelength λ3, an exciting light of wavelength λ2 generated by a laser diode 3, and a phase conjugation light of wavelength λ4 for the exciting light of wavelength λ2 are transmitted to the transmission path L as they are.

Figure 4:
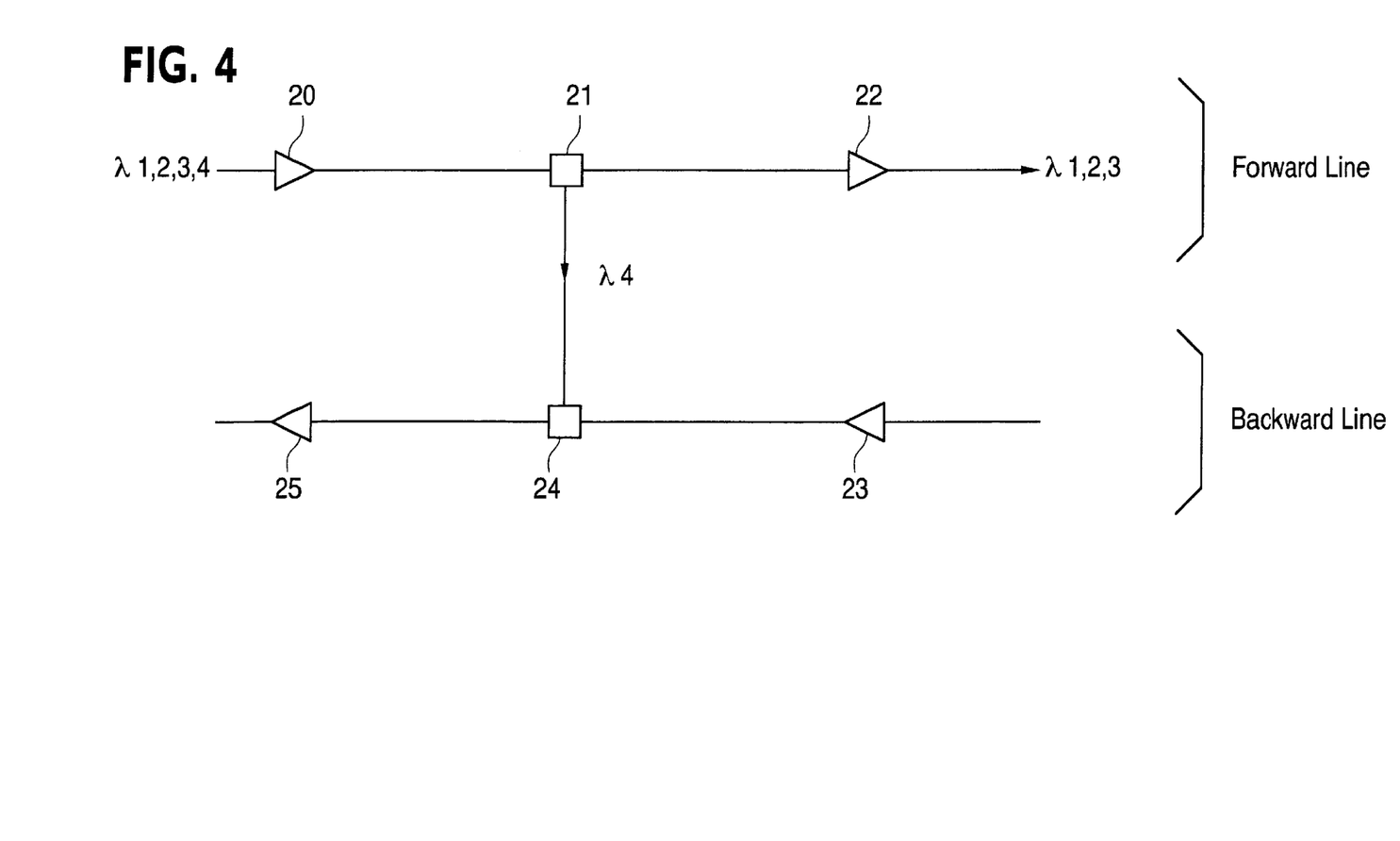
FIG. 4 is a structural example of the plural linear optical repeaters shown in FIG. 3.

FIG. 4 is a structural example of the plural linear optical repeaters shown in FIG. 3. A linear optical repeater L-REP1 will be now considered. The linear optical repeater includes a preamplifier 20, an optical demultiplexer 21, and a post amplifier 22 on a forward line FW from the transmission device I to the transmission device II. The preamplifier 20 and post amplifier 22 are provided in front of and back of the optical demultiplexer 21.

The optical demultiplexer 21 selects the prescribed identifying wavelength λ4 allocated to the linear optical repeater L-REP1, turns it back to a backward line BW, and transmits the signals of the other wavelengths λ1, λ2 and λ3 to the forward line FW.

The backward line BW for the linear optical repeater L-REP1 includes an optical multiplexer 24, pre-amplifier 23 and post amplifier 25. The pre-amplifier 23 and post amplifier 25 are provided in front of and back of the optical multiplexer 24. The optical multiplexer 24 multiplexes the signal of wavelength λ4 turned back from the optical demultiplexer 21 in the forward direction FW with the signals of the other wavelengths in the backward direction BW, which are transmitted through the preamplifier 23, and transmits the multiplexed signal through the post amplifier 25 to the transmission device I.

Therefore, the transmission device I can monitor conditions of the linear optical repeaters to which each wavelengths are fixedly allocated according to levels of signals of wavelengths λ2, λ3 and λ4 returned back.

Figure 5:
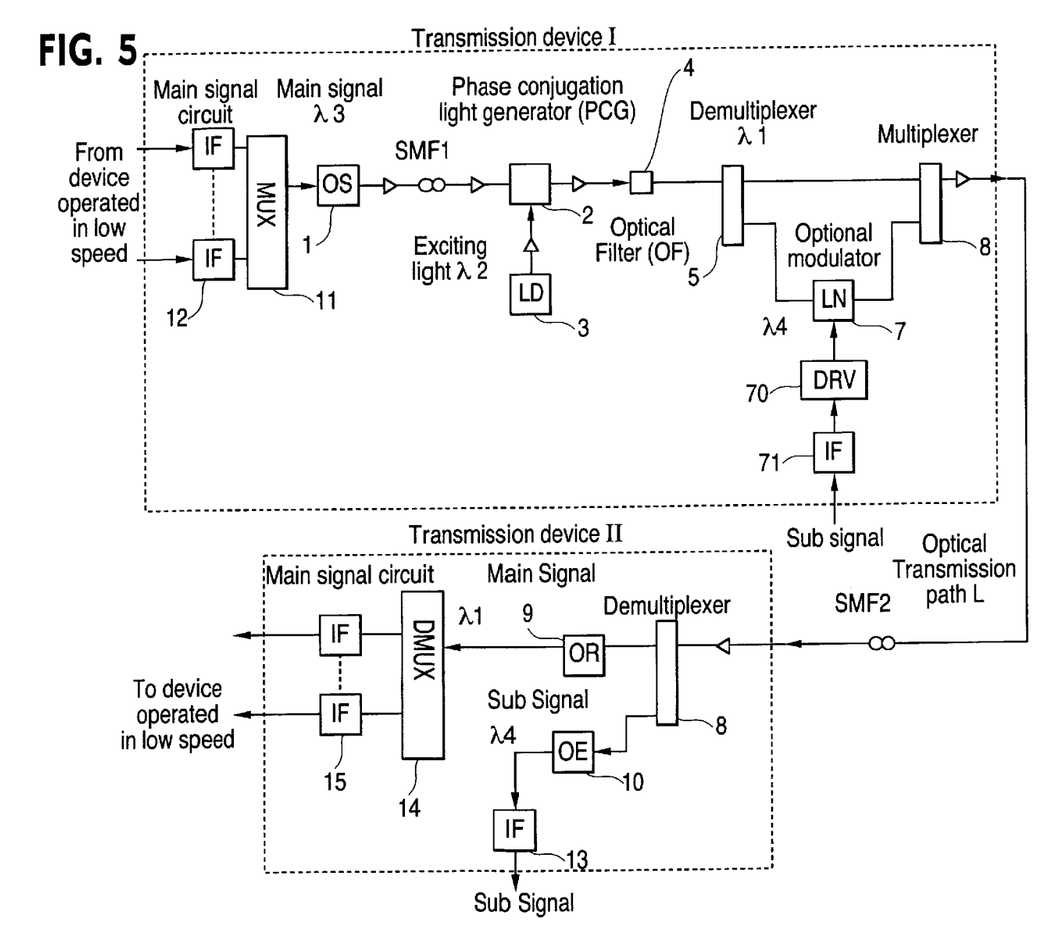
FIG. 5 shows a detailed structural block diagram of the embodiment of FIG. 1

FIG. 5 is a block diagram of an embodiment according to the present invention. It shows a detailed structure of the embodiment of FIG. 1. In this example, phase conjugation lights of wavelengths λ1 and λ4 are employed respectively to transmit main and sub-signals.

In comparison with the structural block diagram of the embodiment of FIG. 1, the transmission device I receives plural low speed line signals sent from devices operated in low speed in the corresponding interface circuits 12. A multiplexer 11 multiplexes these signals in time-division. A main signal transmitter 1 converts the time-division multiplxed signals into an optical signal of wavelength λ3.

Other structures of the transmission device I are the same as those of FIG. 1. In here, the sub-signal is input to a driver 70 through an interface circuit 71, and the sub-signal becomes an external modulating signal in the external optical modulator 7.

In the transmission device II, the main signal receiver 9 receives the optical signal of wavelength λ1 and converts it into an electrical signal. Additionally, an optical demultiplexer 14 demultiplexes the optical signal into multiple low-speed line signals. Then, the multiple signals are transmitted to the corresponding lines through interface circuits 15.

On the other hand, a sub-signal receiver 10 receives an optical signal of wavelength λ4 and converts it into an electrical signal. Additionally, the converted signal is output as a sub-signal through an interface circuit 13. Accordingly, a sub-signal transmission line can be formed between the transmission devices I and II.

Figure 6:
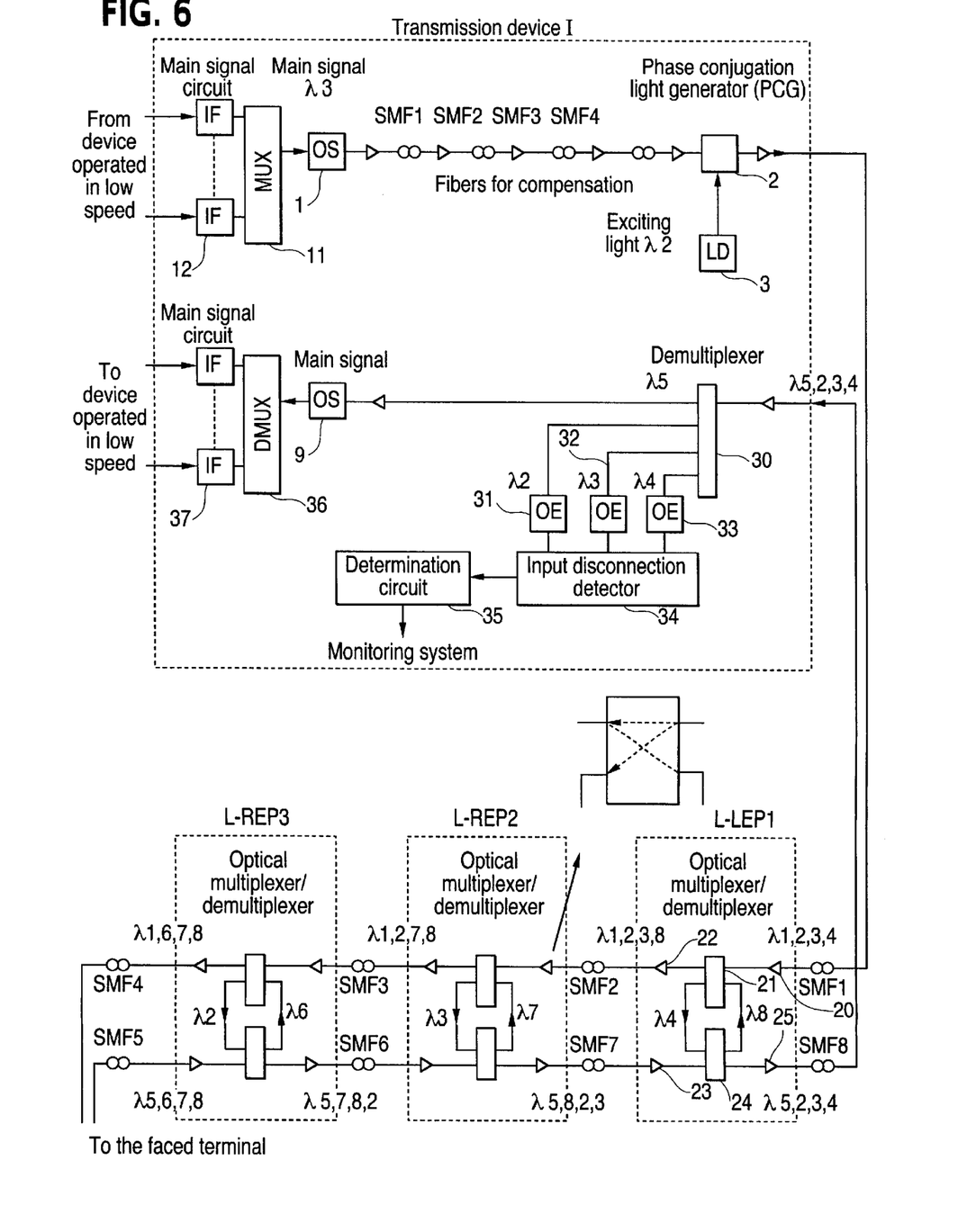
FIG. 6 is a detailed structural block diagram when detecting a failed section corresponding to the embodiment of FIG. 3.

FIG. 6 is a block diagram of a detailed structure when detecting a failed section corresponding to the embodiment of FIG. 3. Similarly to the embodiment of FIG. 5, a main signal of wavelength λ1 can be obtained by multiplexing the low-speed line signals. A phase conjugation generator 2 generates phase conjugation lights of wavelengths λ1 and λ4 and transmits those lights with a main signal of wavelength λ3 and an exciting light of wavelength λ2 to the faced transmission device, not shown in FIG. 6, through repeaters.

In this example, the faced transmission device, not shown in the diagram, also detects the failed point. In this case, optical signals having different wavelengths for detecting the failed point are selected and employed between the faced transmission devices.

Each of the optical repeating amplifiers L-REP1 to L-REP 3 has a structure shown in FIG. 4. Therefore, the optical demultiplexer 30 demultiplexes optical signals of wavelengths λ2, λ3, and λ4 turned back from the corresponding optical repeating amplifiers. The demultiplexed signals are respectively input to input disconnection detector 34 through respective optical/electrical converters 31 to 33.

In here, the faced transmission device, not shown in FIG. 6, detects the failed point. In this case, different wavelengths of the optical signals for detecting the failed point are selected and used between the faced transmission devices.

The input disconnection detector 34 detects whether or not there are outputs from the optical/electrical converters 31 to 33 and informs the result to a determination circuit 35. The determination circuit 35 detects a repeating section where a failure occurs and transmits the result to a monitoring system.

Figure 7:
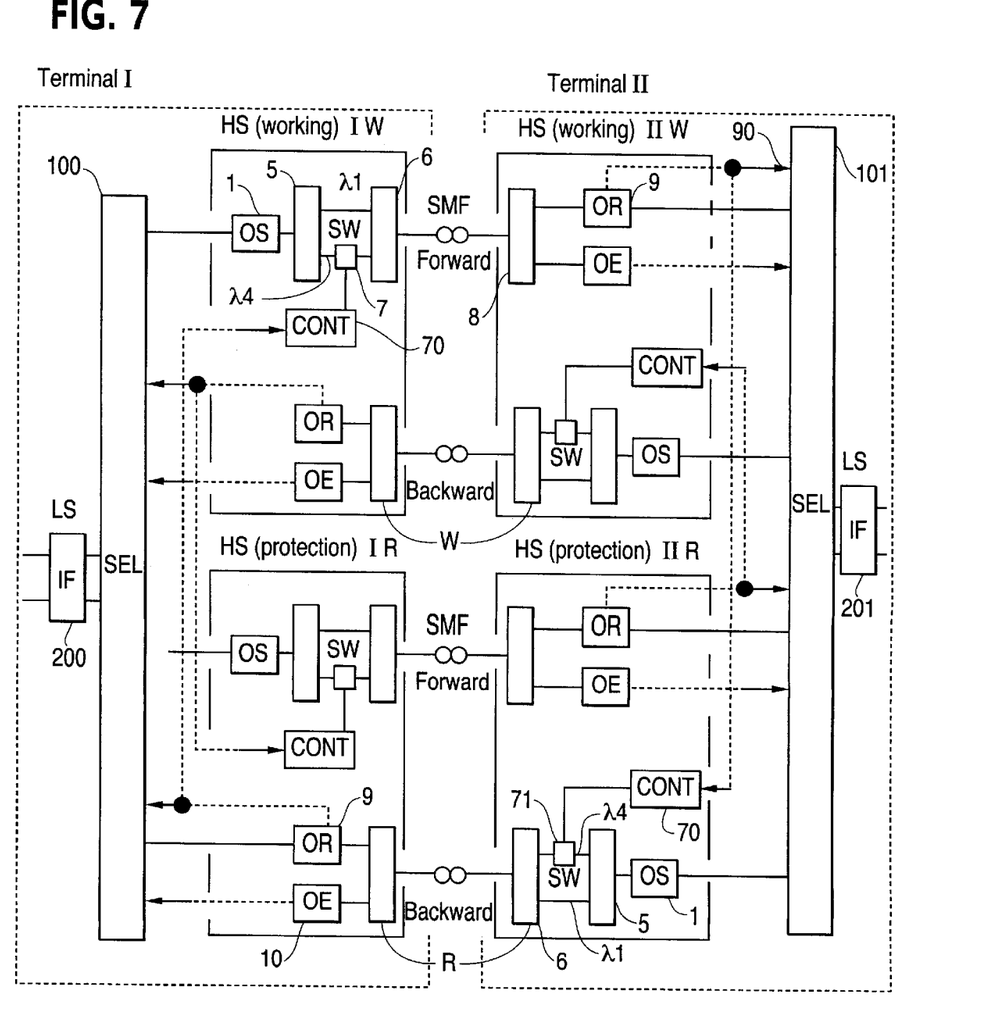
FIG. 7 is a structural block diagram applying the present invention to a redundant system.

FIG. 7 is a structural block diagram embodying the present invention to a redundancy system. Transmission devices I and II are switched and connected through working terminals, IW, IIW and protection terminals IR, IIR.

The structure of the transmission part in the transmission device of FIG. 7 is the same as that of the transmission part in the transmission device I of FIG. 1, and the structure of the transmission part in the transmission device of FIG. 7 is the same as that of the transmission part of the transmission device II of FIG. 1.

In FIG. 7, it is assumed, for example, that a working terminal IW of the transmission device I is linked to a working terminal IIW of the transmission device II. When a main signal receiver 9 of the working terminal IIW detects the received signal disconnection, a controller 90 switches the own selector 101 so as to connect a protection terminal IIR to a line switch circuit 201.

The controller 90 further transmits a switching and controlling signal to a sub-signal transmission controller (CONT) 70 of a protection terminal IIR of the own device. Therefore, the sub-signal transmission controller 70 drives a switch circuit 71 with the switched and controlled signal.

The switch circuit 71 activates so as to stop transmitting a sub-signal in a normal status and transmits the sub-signal when the switching and controlling signal is present.

Alternatively, it is also possible to control the switch device 71 to switch to the sub-signal of which wavelength is different from that of the sub-signal transmitted in a normal status when there is a switching control signal.

As having explained the present invention in accompanying with the attached drawings, it is possible to provide an optical transmission system to realize generating a sub-signal without employing an exclusive optical source, determining normality of repeaters by the sub-signal and switching a switch for sub-signal transmission when a failure occurs.

The present invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical signal transmission system, comprising:

first and second optical signal transmission devices connected to each other through an optical transmission path, the first optical signal transmission device generating first and second phase conjugation lights having first and fourth optical wavelengths, respectively, which are different from each other, the first and second phase conjugation lights being generated by a main signal light having a third optical wavelength and an exciting light having a second optical wavelength, the second phase conjugation light having the fourth optical wavelength being intensity modulated with a sub-signal having a speed slower than that of the main signal light, the first optical transmission device concurrently transmitting the first phase conjugation light and the second phase conjugation light, of which the intensity has been modulated by the sub-signal, through the optical transmission path; and the second optical signal transmission device receiving the first phase conjugation light and the second phase conjugation light intensity modulated with the sub-signal, through the optical transmission path, the second optical signal transmission device wavelength demultiplexing the received first and second phase conjugation lights and obtaining the main and sub-signals.

2. The optical signal transmission system according to claim 1, wherein the first optical signal transmission device includes an optical fiber having a characteristic of waveform distortion equivalent to that of the optical transmission path, and the optical fiber included in the first optical signal transmission device generates the first phase conjugation light having the first optical wavelength by the main signal light being transmitted through the optical fiber.

3. An optical signal transmission system, comprising:

first and second optical signal transmission devices connected to each other through an optical transmission path, the first optical signal transmission device generating phase conjugation lights having first and fourth optical wavelengths, respectively, which are different from each other, the first and second phase conjugation lights being generated respectively by a main signal light having a third optical wavelength and an exciting light having a second optical wavelength, the first optical signal transmission device modulating the intensity of the main signal light with a sub-signal having a speed slower than that of the main signal light, and concurrently transmitting the first phase conjugation light and the main signal light, of which the intensity has been modulated by the sub-signal, through the optical transmission path, and the second optical signal transmission device receiving the first phase conjugation light and the main signal light intensity modulated by the sub-signal, through the optical transmission path, the second optical signal transmission device wavelength demultiplexing the first phase conjugation light and the main signal light and obtaining the main and sub-signals.

4. The optical signal transmission system according to claim 3, wherein the first optical signal transmission device includes an optical fiber having a characteristic of waveform distortion equivalent to that of the optical transmission path, and the first optical signal transmission device generates the first phase conjugation light having the first optical wavelength from the main signal light being transmitted through the optical fiber.

5. An optical signal transmission system, comprising:

first and second optical signal transmission devices connected each other through an optical transmission path, the first optical signal transmission device generating plural phase conjugation lights, comprising a first phase conjugation light which is used to transmit information of a main signal light, and a second phase conjugation light, the first optical signal transmission device modulating the intensity of the second phase conjugation light with a sub-signal having a speed slower than that of the main signal light, and concurrently transmitting the second phase conjugation light of which the intensity has been modulated, with the first phase conjugation light; and the second optical signal transmission device receiving the first plural phase conjugation light and the second phase conjugation light intensity modulated by the sub-signal, through the optical transmission path, the second optical signal transmission device wavelength demultiplexing the received first and second phase conjugation lights and obtaining the main and sub-signals.

6. The optical signal transmission system according to claim 5, wherein the first optical signal transmission device includes an optical fiber having a characteristic of waveform distortion equivalent to that of the optical transmission path, and the optical fiber in the first optical signal transmission device generates the first phase conjugation light from the main signal light being transmitted through the optical fiber.

7. An optical signal transmission system, comprising:

first and second optical signal transmission devices connected to each other through an optical transmission path having plural optical repeating amplifiers, wherein the first and second transmission devices each respectively comprise:

a transmitter circuit, which generates plural phase conjugation signal lights from signal lights, including a main signal light, each phase conjugation light having a respective predetermined optical wavelength, the wavelengths of the plural phase conjugation lights, except the phase conjugation light generated from the main signal light, corresponding respectively to the plural optical repeating amplifiers such that each optical repeating amplifier has a corresponding phase conjugation light, the transmitter circuit transmitting the phase conjugation lights on the optical transmission path; and a receiver circuit, which receives at least a portion of the plural phase conjugation lights, which phase conjugation lights are selectively turned back by the corresponding optical repeating amplifiers, the receiver circuit including a circuit which evaluates a failed point of the plural optical repeating amplifiers from existence or non-existence status of the received phase conjugation lights.

8. The optical signal transmission system according to claim 7, wherein the optical transmission path includes an upstream transmission path directed from the first optical signal transmission device to the second optical signal transmission device and a downstream transmission path directed from the second optical signal transmission device to the first optical transmission device, the phase conjugation lights directed to the second optical signal transmission device, which are turned back by the plural optical repeating amplifiers, are transmitted after being turned back, through the downstream transmission path, and the phase conjugation lights directed to the first optical transmission device, which are turned back of by the plural optical repeating amplifiers, are transmitted after being turned back, through the upstream transmission path.

9. The optical signal transmission system according to claim 7, wherein the wavelengths of the phase conjugation lights which correspond with plural optical repeating amplifiers and are transmitted from the first optical signal transmission device, are different from the wavelengths of the phase conjugation lights which correspond with plural optical repeater amplifiers and are transmitted from the second optical signal transmission device.

10. An optical signal transmission device connected to a faced transmission device through an optical transmission path, comprising:

a signal generator generating phase conjugation lights having first and fourth different optical wavelengths respectively from a main signal light having a third optical wavelength and an exciting light having a second optical wavelength;

a modulator modulating the intensity of the phase conjugation light having the fourth optical wavelength with a sub-signal having a speed slower than that of the main signal light; and a transmitter concurrently transmitting the phase conjugation light having the first optical wavelength and the phase conjugation light having the fourth optical wavelength, of which the intensity has been modulated with the sub-signal, through the optical transmission path.

11. An optical signal transmission device connected to a faced transmission device through an optical transmission path, comprising:

a signal generator generating phase conjugation lights having first and fourth different optical wavelengths respectively from a main signal light having a third optical wavelength and an exciting light having a second optical wavelength;

a modulator modulating the intensity of the main signal light having the third optical wavelength with a sub-signal, having a speed slower than that of the main signal light; and a transmitter concurrently transmitting the phase conjugation light having the first optical wavelength and the main signal light, of which the intensity has been modulated with the sub-signal, through the optical transmission path.

12. An optical signal transmission device connected to a faced transmission device through an optical transmission path, comprising:

a signal generator generating plural phase conjugation lights;

an output device to output a first one of the plural phase conjugation lights for transmitting information of a main signal light;

a modulator modulating the intensity of a second one of the plural phase conjugation lights, which is different from the first phase conjugation light, the second phase conjugation light being modulated with a sub-signal having a speed slower than that of the main signal light; and a transmitter concurrently transmitting the modulated second phase conjugation light, of which intensity is modulated by sub-signal, and the first phase conjugation light, which transmits information of the main signal light.

13. An optical signal transmission device connected to a faced transmission device through an optical transmission path having plural optical repeating amplifiers, comprising:

a signal generator generating plural phase conjugation lights from a plurality of signal lights including a main signal light, the phase conjugation lights, except the phase conjugation light generated from the main signal light employing wavelengths to respectively identify each of the plural optical repeating amplifiers;

a transmitter transmitting the plural phase conjugation lights to the optical transmission path; and a detection system to detect failed optical repeating amplifiers from existence or non-existence status of the phase conjugation lights respectively identifying the optical repeater amplifiers, which phase conjugation lights are selectively turned back by the optical repeating amplifiers that they identify.

14. A optical signal transmission system having working and protection groups, each of which first and second optical transmission devices are faced and connected each other through an optical transmission path, wherein a second working optical signal transmission device of the working group generates a switch signal to switch the working and protection groups when detecting that a main signal is not received, the groups on the second optical transmission device according to the switch signal are switched, and plural phase conjugation lights are generated, one of the plural phase conjugation lights is selected to transmit a main signal light, and one of the phase conjugation lights, of which wavelength is different from that of the selected phase conjugation light as group switching information to the faced first optical signal transmission device.

15. An optical signal transmission system having first and second optical signal transmission devices provided for working and protection groups faced each other through an transmission path, comprising:

a means for generating a switch signal to switch the working and protection groups when the second optical signal transmission device for working group detects that a main signal is not received, a means for generating first and second phase conjugation lights having different optical wavelengths according to an exciting light having the second optical wavelength according to a main signal light having a first optical wavelength and an excision light having a second optical wavelength, and a means for transmitting the phase conjugation light having the first wavelength as a main signal and the exciting light having the second optical wavelength for information to the faced first optical signal transmission device.

16. An optical signal transmission system having first and second optical signal transmission devices provided for working and protection groups faced each other through an transmission path, comprising:

a means for generating a switch signal to switch the working and protection groups when the second optical signal transmission device for working group detects that a main signal is not received, a means for generating first and second phase conjugation lights having different optical wavelengths according to an exciting light having the second optical wavelength according to a main signal light having a first optical wavelength and an excision light having a second optical wavelength, and a means for transmitting the phase conjugation light having the second wavelength as a main signal and the exciting light having the second optical wavelength for information to the faced first optical signal transmission device.

17. The optical signal transmission system according to claim 14, wherein the group switching signal is generated when the first optical signal transmitting device receives the information for switching groups transmitted from the second optical signal transmitting device to switch the transmission device from working to protection.

18. The optical signal transmission system according to claim 15, wherein the group switching signal is generated when the first optical signal transmitting device receives the information for switching groups transmitted from the second optical signal transmitting device to switch the transmission device from working to protection.

19. The optical signal transmission system according to claim 16, wherein the group switching signal is generated when the first optical signal transmitting device receives the information for switching groups transmitted from the second optical signal transmitting device to switch the transmission device from working to protection.

* * * * *